(12) United States Patent
Naito et al.

(10) Patent No.: US 6,282,103 B1
(45) Date of Patent: Aug. 28, 2001

(54) SWITCHING POWER SUPPLY USING AN INDUCTOR DEVICE TO PREVENT HARMONIC CURRENT GENERATION

(75) Inventors: Yoshinao Naito; Koji Takada; Maki Ota; Masaki Hashimoto; Kazunori Yasuda, all of Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/729,452

(22) Filed: Dec. 4, 2000

(30) Foreign Application Priority Data

Dec. 28, 1999 (JP) .................................................. 11-373340

(51) Int. Cl.[7] .................................................. H02M 3/335
(52) U.S. Cl. .......................................... 363/21.12; 363/47
(58) Field of Search .................................. 363/39, 47, 15, 363/16, 21.02, 21.03, 131, 21.12, 21.17, 140

(56) References Cited

U.S. PATENT DOCUMENTS

| | | | |
|---|---|---|---|
| 5,673,184 | * | 9/1997 | Rilly et al. .......................... 363/21.04 |
| 5,751,561 | * | 5/1998 | Ho et al. ............................ 363/21.02 |
| 5,790,389 | * | 8/1998 | Hua ........................................ 363/20 |

* cited by examiner

*Primary Examiner*—Shawn Riley
(74) *Attorney, Agent, or Firm*—Moonray Kojima

(57) ABSTRACT

A switching power supply wherein an inductor device is connected to the center tap of a primary winding of a transformer with a switching device provided to apply high frequency signals to the transformer concurrently with a rectified smoothed input signal applied to the primary winding concurrently by another inductor device so that the secondary winding of the transformer produces a DC output signal which is free of harmonic current and whereby the switching power supply power factor is improved.

16 Claims, 17 Drawing Sheets

FIG.10
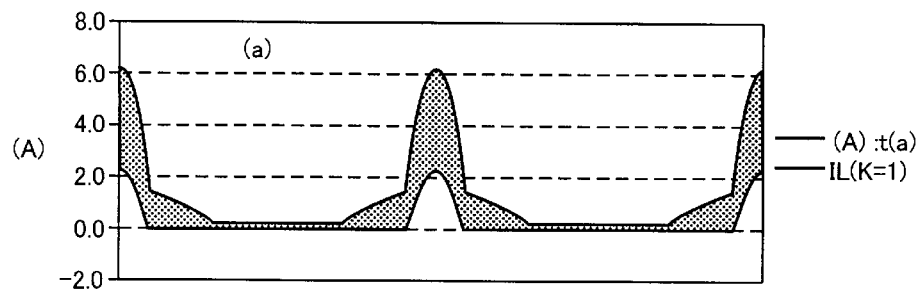
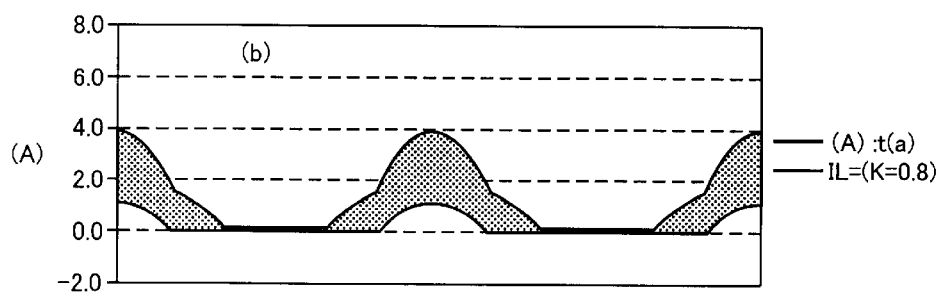
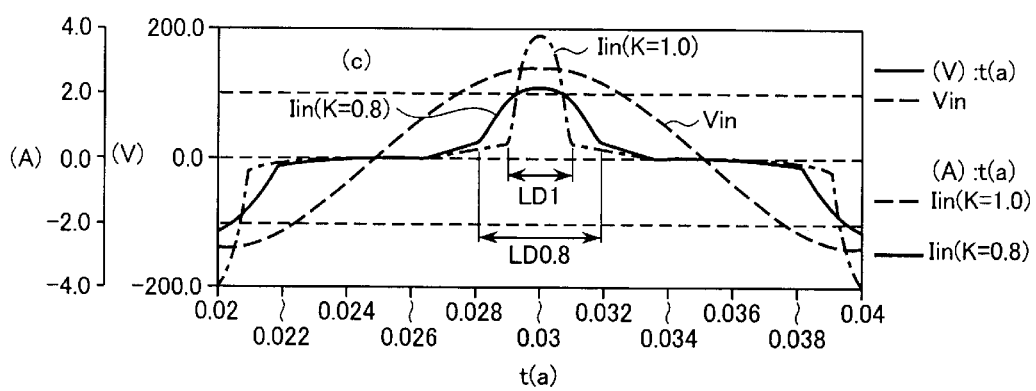

FIG.13
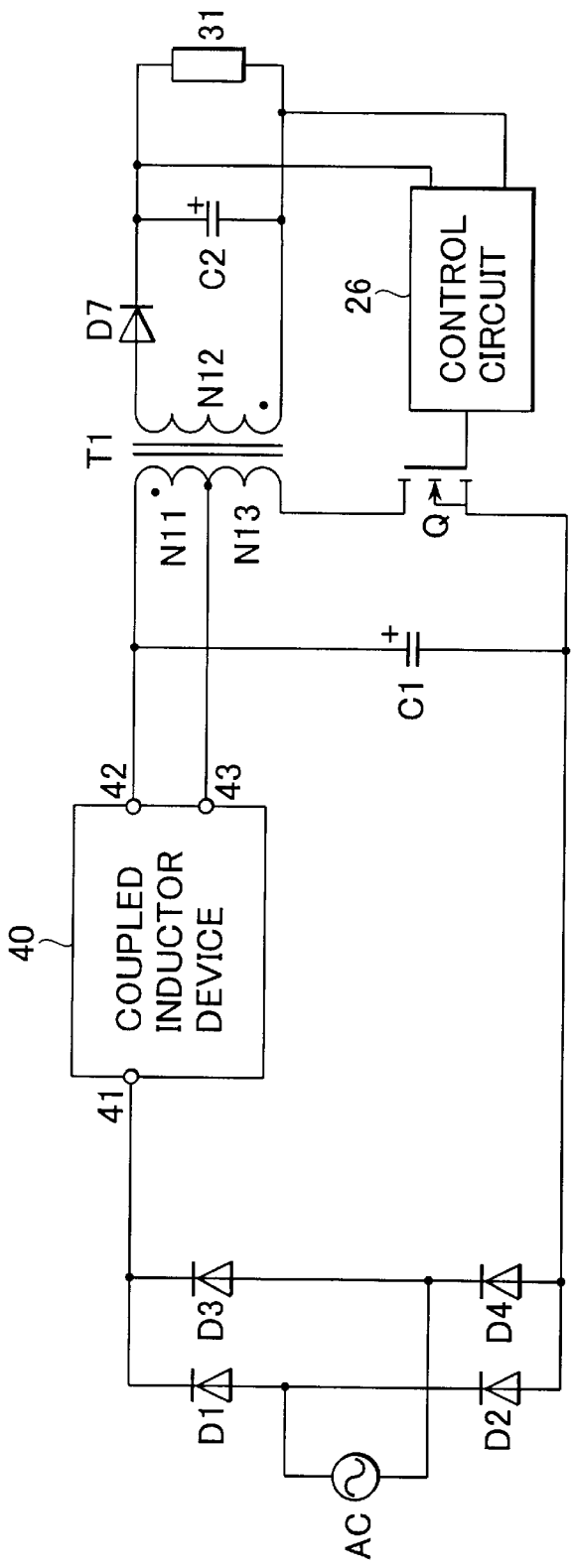
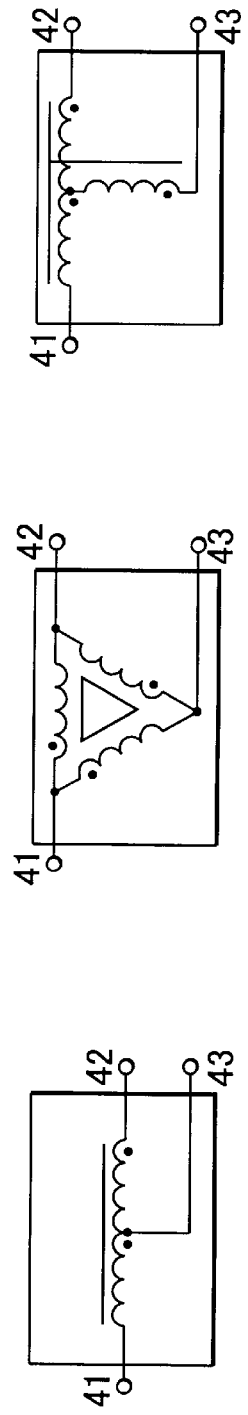

FIG.17

| INPUT VOLTAGE 269Vac, OUTPUT POWER 70W | | |
|---|---|---|
| | DCM (L=80uH,K=1) | CCM (L=200uH,K=0.86) |
| VOLTAGE OF SMOOTHING CAPACITOR | 440V | 396V |

SWITCHING POWER SUPPLY USING AN INDUCTOR DEVICE TO PREVENT HARMONIC CURRENT GENERATION

BACKGROUND OF THE INVENTION

1. Field of Invention

This invention relates to an improved switching power supply wherein an inductor device is provided to suppress a harmonic current therein, and wherein she power factor thereof is improved.

2. Description of the Prior Art

A conventional switching power supply is shown, for example, in FIG. 1, and comprises an AC power source AC connected to a diode bridge 11, consisting of diodes D1–D4, and a smoothing capacitor C1 connected in parallel to diode bridge 11. Diode bridge 11 is a rectifying circuit used to rectify the output of power source AC. The positive terminal of smoothing capacitor C1 is connected to terminal 21 of primary winding N1 of a transformer TR. The primary winding terminal 22 of winding N1 is connected to the negative terminal of smoothing capacitor C1 through switch Q. The terminals 23 and 24 of secondary winding N2 of transformer Tr are connected to rectifying circuit 25 consisting of diode 27 and smoothing capacitor C2. The output of rectifying circuit 25 is connected to a load circuit 31.

A control circuit 26 controls the output voltage of the rectifying circuit 25 and provides control signal GSW to switch Q so that the output voltage of rectifying circuit 25 is kept constant. Transformer TR, rectifying circuit 25, switch Q and control circuit 26 comprise a DC/DC converter 20 that performs an electrically isolated transfer of DC power, applied to the primary side of transformer TR to the secondary side thereof.

In switching power supply 10, a DC voltage VC1, obtained by AC/DC converting the output of AC power supply AC, by means of diode bridge 11 and smoothing capacitor C1, is applied to the terminal 21 of transformer TR of DC/DC converter 20, and is turned ON or OFF by switch Q, made for example, of a field effect transistor (FET). Hence, a switching current IN2 is induced in secondary winding N2 because current IN1 flows, as a train of pulses, through primary winding N1. Switching current IN2 is then converted to a DC current by rectifying circuit 25 which consists of diode D7 and smoothing capacitor C2, and is supplied to load circuit 31.

The switching power supply 10 AC/DC converts the output of AC power supply source AC, applied to rectifying circuit 11, using rectifying circuit 11 and smoothing capacitor C1. The DC power signal thus obtained is isolated by means of DC/DC converter 20, and then is supplied to load circuit 31. Accordingly, switching power supply 10 supplies a DC power signal which is isolated from the AC power source AC.

However, the input current ICI of smoothing capacitor C1 is not turned ON when the rectified voltage Vrec of AC power source AC is lower than voltage VC1, provided across smoothing capacitor C1. Hence, input current Iin (i.e. output current of AC power source AC) of switching power supply 10 takes the waveform of a pulse train, causing the conduction angle of input current Iin to become smaller. This results in decrease of the power factor and increase in harmonic current.

FIG. 2 shows waveforms of input voltage Vin and input current Iin of switching power supply 10, rectified voltage Vrect, and voltage VC1 provided across smoothing capacitor C1. As is evident from FIG. 2, input current Iin is not turned ON during interval T2, in which rectified voltage Vrec is lower than voltage VC1 provided across smoothing capacitor C1. In contrast, input current Iin is caused to flow as a series of pulses during interval T1, in which rectified voltage Vrec is higher than voltage VC1 provided across smoothing capacitor C1.

Accordingly, input current Iin flows as a series of pulses and causes the conduction angle of the input current Iin to become smaller. Thus, disadvantageously, in the conventional switching power supply, the power factor thereof is caused to decrease and the harmonic current is caused to increase.

SUMMARY OF THE INVENTION

Accordingly, an object of the invention is to overcome the aforementioned and other deficiencies, disadvantages and problems of the prior art.

Another object is to provide a switching power supply comprising an inductor device having a center tap, wherein harmonic current is prevented from being generated, and wherein power factor thereof is increased.

BRIEF DESCRIPTION OF THE DRAWINGS

FIG. 10 is a waveform chart depicting input current at different parts of the embodiment of FIG. 3.

FIG. 13 is a block diagram depicting yet another illustrative embodiment of the invention.

FIG. 17 is a table depicting advantages of the invention.

DETAILED DESCRIPTION OF THE PREFERRED EMBODIMENTS

Figure 1:
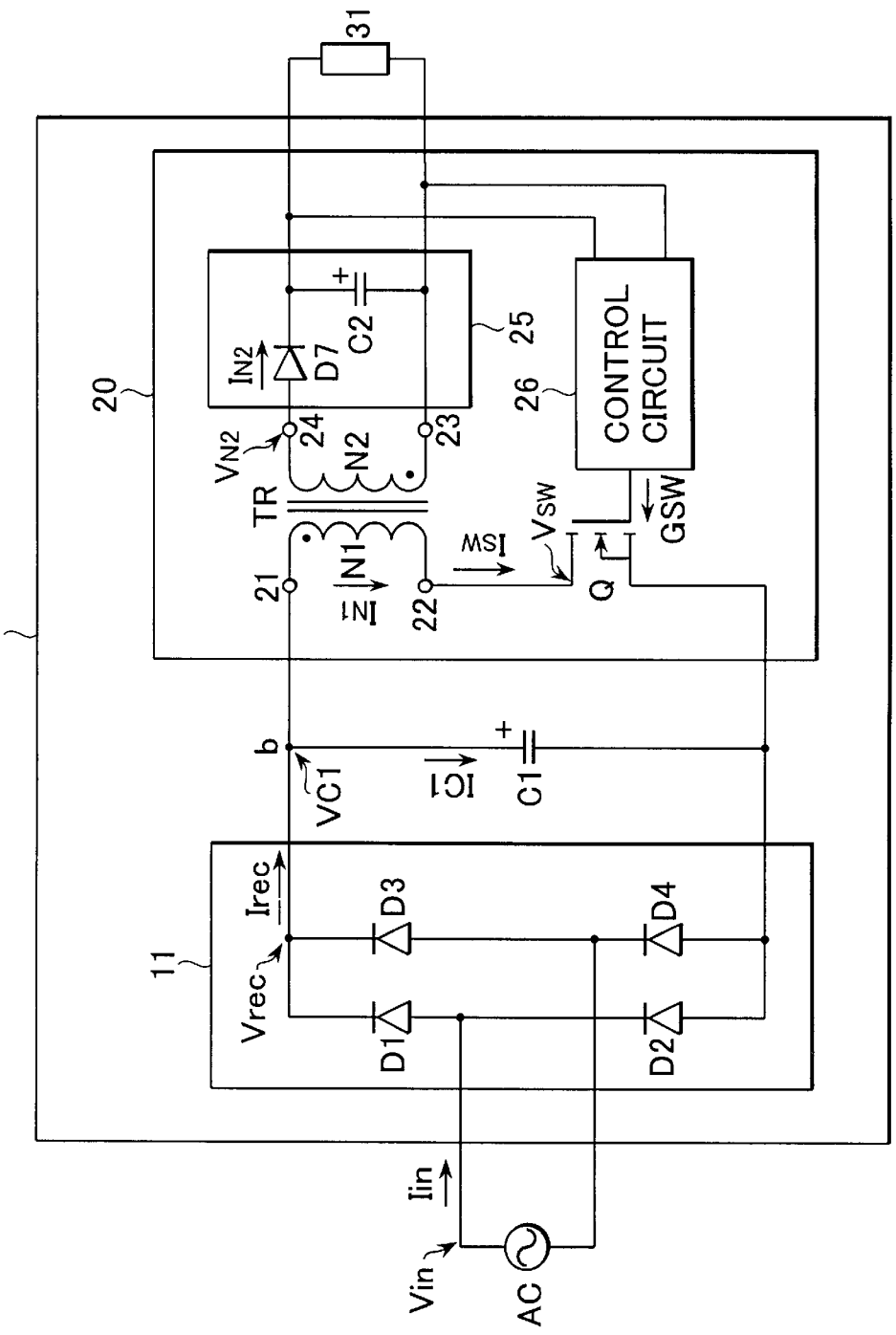
FIG. 1 is a block diagram depicting a convention switching power supply.
Figure 2:
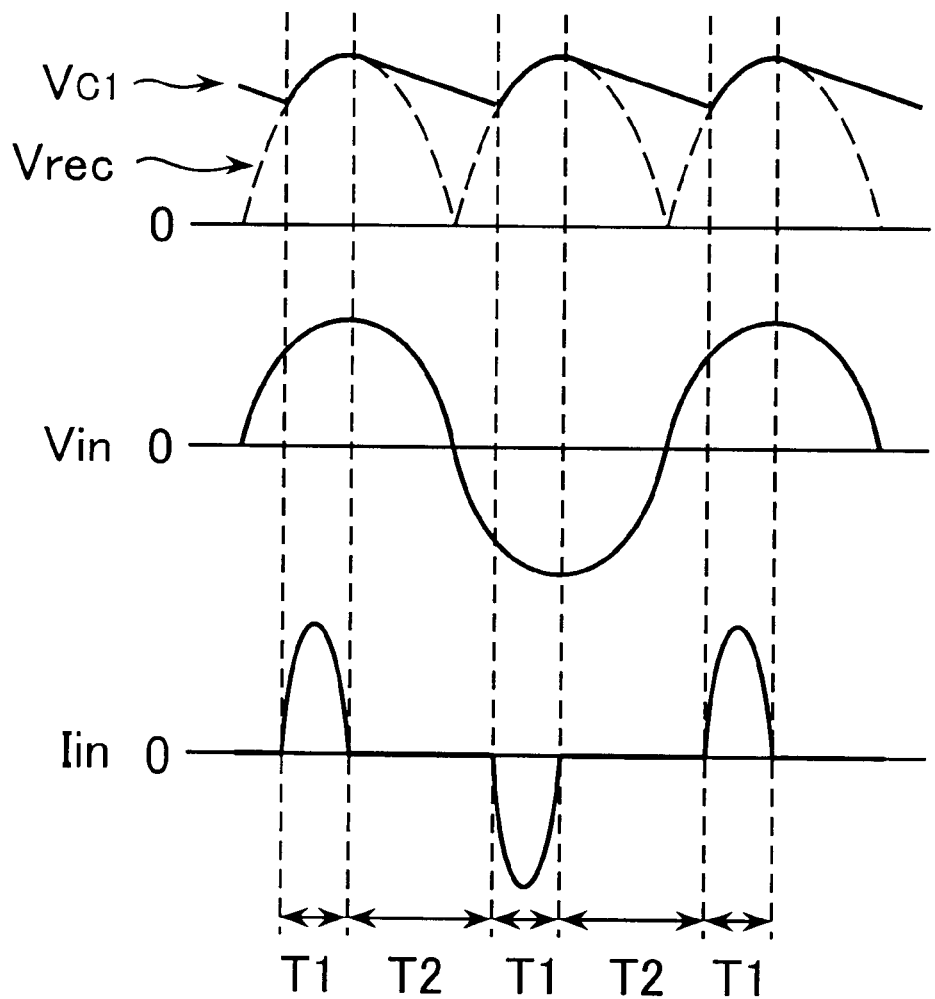
FIG. 2 is a waveform chart depicting waveforms occurring at different parts of the switching power supply of FIG. 1.
Figure 3:
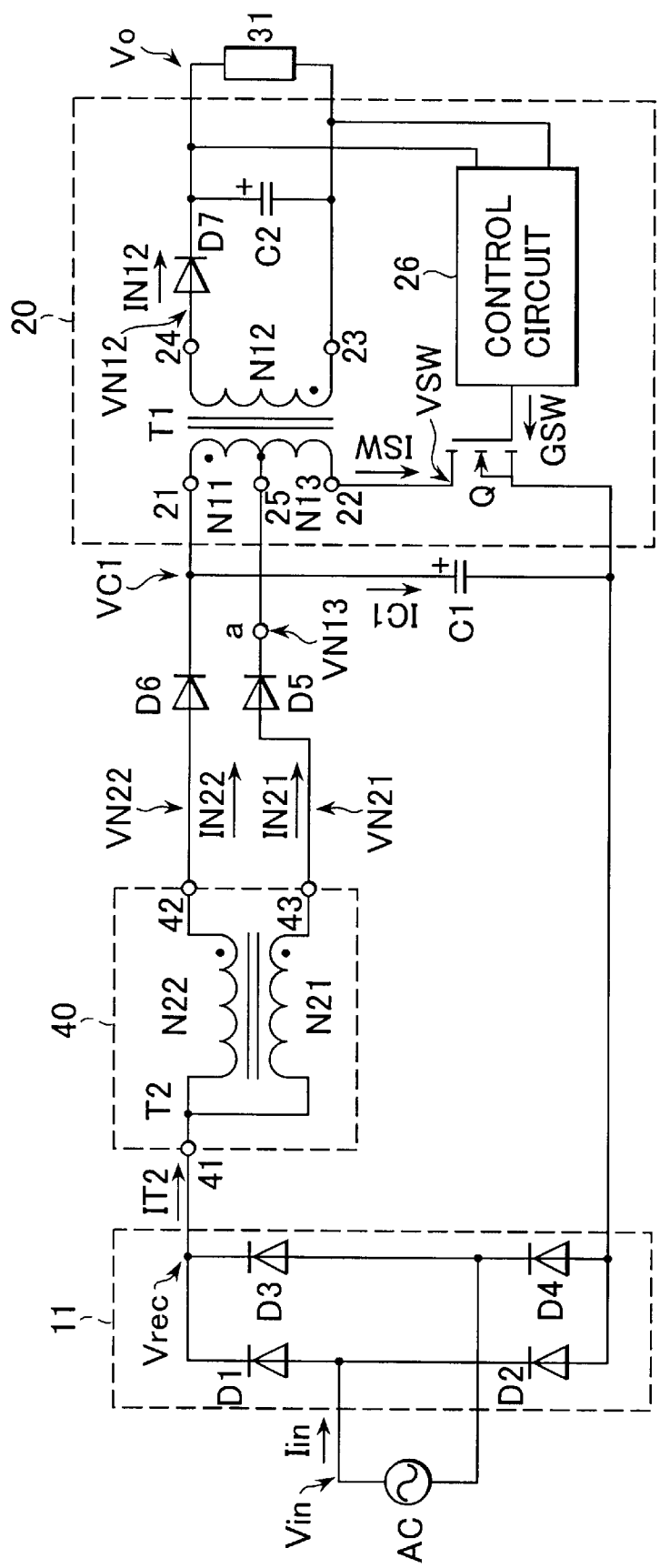
FIG. 3 is a block diagram depicting an illustrative embodiment of the invention.

FIG. 3 shows a circuit which differs from that of FIG. 1 in that a transformer T1, having a center tap 25, is used instead of transformer TR, which does not have a center tap, so that a voltage developed at center tap 25 can be used as a high frequency AC voltage source. Also, in FIG. 3 a coupled inductor device 40 and diodes D5 and D6 are disposed between a diode bridge 11 and a DC/DC converter 20. Other elements which are identical to those in FIG. 1 carry similar symbols and are not discussed hereat for clarity of description.

In FIG. 3, an AC power source AC is connected to diode bridge 11, with the positive output terminal thereof connected to a first terminal 41 of coupled inductor device 40. The coupled inductor device 40 comprises a transformer T2. The input terminals of winding N2 and winding N22 of transformer T2 are connected to first terminal 41 of coupled inductor device 40. The output terminal of winding N22 is connected to a second terminal 42 of coupled inductor device 40. The output terminal of winding N21 is connected to a third terminal 43 of coupled inductor device 40. The number of turns of winding N21 and winding N22 are set to be N21>N22, wherein the coefficient of coupling is one.

Second terminal 42 of coupled inductor device 40 is connected to a positive terminal of a smoothing capacitor C1 through diode D6. Third terminal 43 is connected to center tap 25 of transformer T1 through diode D5.

Figure 4:
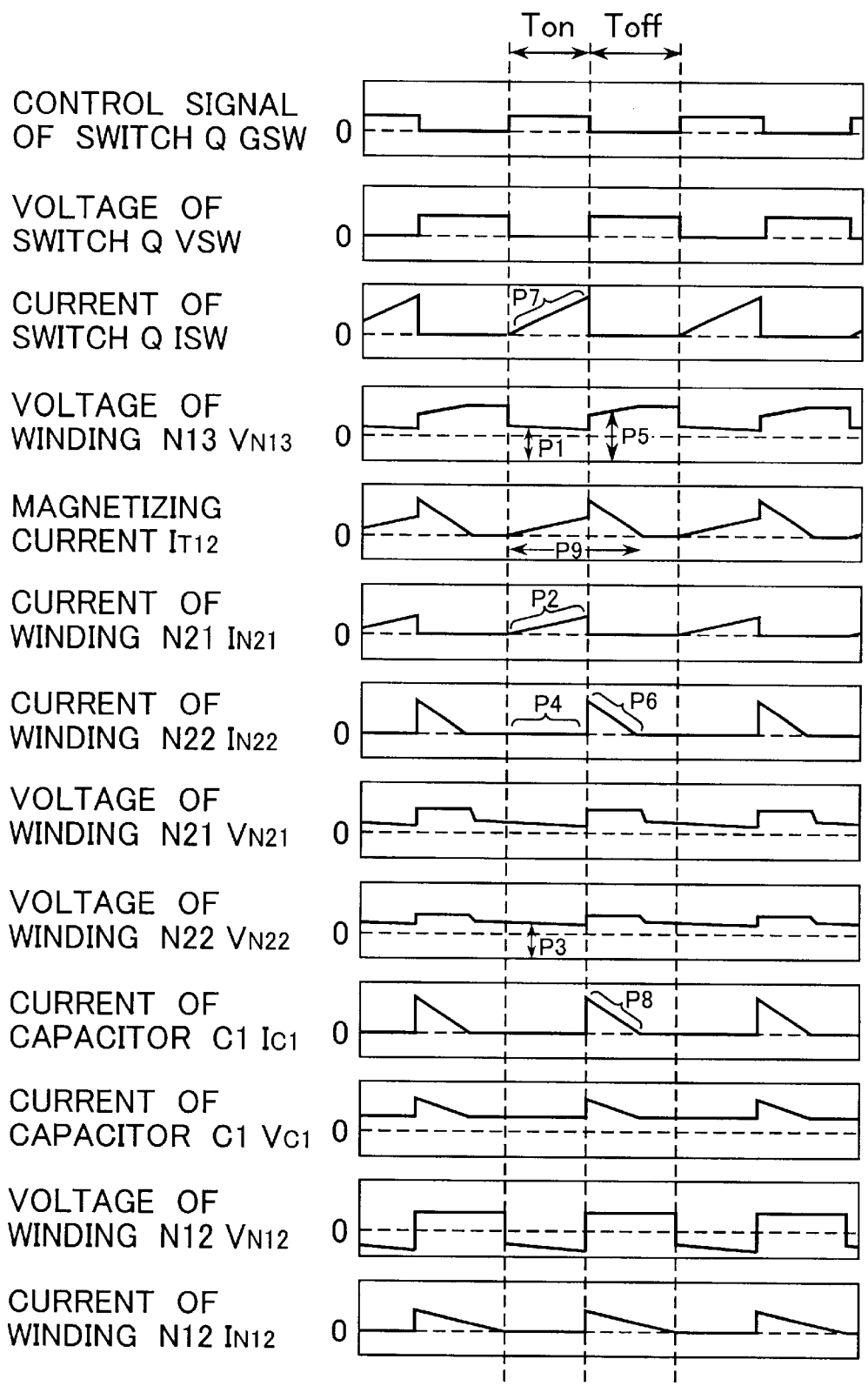
FIG. 4 is a waveform chart depicting waveforms occurring at different parts of the embodiment of FIG. 3.

Operation of the switching power supply of FIG. 3 will now be described with reference to the waveforms of FIG. 4. The primary winding comprises a winding N11 and winding N13 with the center tap 24 therebetween. The secondary winding comprises one winding N12. FIG. 4 depicts the following signals: control signal GSW of switch Q; voltage VSW developed across the terminals of switch Q; a current ISW flowing into switch Q; a voltage VN13 developed across winding N13; a magnetizing current IT2 flowing into coupled inductor device 40; currents IN21 and IN22 flowing through windings N21 and N22, respectively; voltages VN21 and VN22 developed across windings N21 and N22, respectively; current IC1 flowing into smoothing capacitor C1; voltage VC1 developed across smoothing capacitor C1; and voltage VN12 and current IN12 induced in winding N12.

Interval Ton, in FIG. 4, is a time interval during which switch Q remains turned ON. During the time interval Ton, current ISW is turned ON because control signal GSW of switch Q becomes high. Hence, voltage VSW developed across the terminals of switch Q becomes low. Since switch Q is turned ON during interval Ton, voltage VN13 (indicated by P1 in FIG. 4) which is determined by voltage VC1 of smoothing capacitor C1 and the number of turns of winding N11 and winding N12, is developed at a connection point "a" (see FIG. 3) between transformer T1 and diode D5. Assuming that the number of turns of winding N11 and winding N13 are n11 and n13, respectively, voltage VN13 produced at this point is:

$$VN13=[n13/(n11+n13)] \times VC1 \qquad (1)$$

If the VC1 voltage of smoothing capacitor C1 is higher than rectified voltage Vrec of diode bridge 11, the expression VN13≦Vrec<VC1, holds true when input current Iin is turned ON. Hence, diode D5 is turned ON and current Iin (indicated by P2 in FIG. 4) which is determined by the difference between rectified voltage Vrec and voltage VN13 and the inductance of windings N21 of transformer T2, is caused to flow through winding N21.

Since diode D5 is turned ON at this point, voltage VN22 (indicated by P3 in FIG. 4) represented by below equation (2) is developed across winding N22:

$$VN22=Vrec+(VN13-Vrec) \times (n22/n21) \qquad (2)$$

wherein, n21 and n22 are the number of turns of winding N21 and winding N22, respectively.

Because of the priorly described expression "VN13≦Vrec<VC1", the term "(VN13−Vrec)" in equation (2) equals zero or a negative value and the expression VN22<VC1 holds true. Thus, diode D6 is not turned ON, and hence, current IN22 (indicated by P4 in FIG. 4) is not turned ON, either.

Interval Toff, on the other hand, is a time interval during which switch Q remains turned OFF. During this time interval, control signal GSW of switch Q remains low. Accordingly, current ISW does not flow through switch Q. Hence, voltage VSW developed across the terminals of switch Q is increased.

Since switch Q is turned OFF during interval Toff, voltage VN13 (indicated by P5 in FIG. 4), which is determined by voltage VN12 developed across winding N12, voltage VC1 of smoothing capacitor C1 and the number of turns of windings N12 and N13 is developed across winding N13. Voltage VN13 produced at this point is:

$$VN13=VCL+(n11/n12) \times VN13 \qquad (3)$$

Because of prior expression "Vrec<VC1", the expression Vrec<VN13 holds true. Thus, diode D5 is not turned ON. Accordingly, current IN22 (indicated by P6 in FIG. 4), whose initial value is n21/n22 times current IN21 immediately before switch Q is turned OFF and which is determined by the difference between rectified voltage Vrec and Voltage VC1 of capacitor C1 and the inductance of winding N22 is caused to flow through winding N22, thereby resetting transformer T2.

Accordingly, in the invention, current IN21, indicated by P2 in FIG. 4 is caused to flow through winding N21, when during the On state interval of switch Q, individual voltages satisfy the conditions where VN13≦Vrec holds true. Thus, a current n1/(n11+n13) times current IN21 (indicated by P7 in FIG. 4) is caused to flow through switch Q. During the OFF state interval of switch Q, when individual voltages satisfy the condition where Vrec<VN13 holds true, current IN22, indicated by P6 in FIG. 4, is caused to flow through winding N22 into capacitor C1 as current IcL (indicated by P8 in FIG. 4). Hence, magnetizing current IT2 (indicated by P9 in FIG. 4) which is the sum of currents IN21 and IN22, flows through coupled inductor device 40. Accordingly, input current Iin is turned ON.

Figure 5:
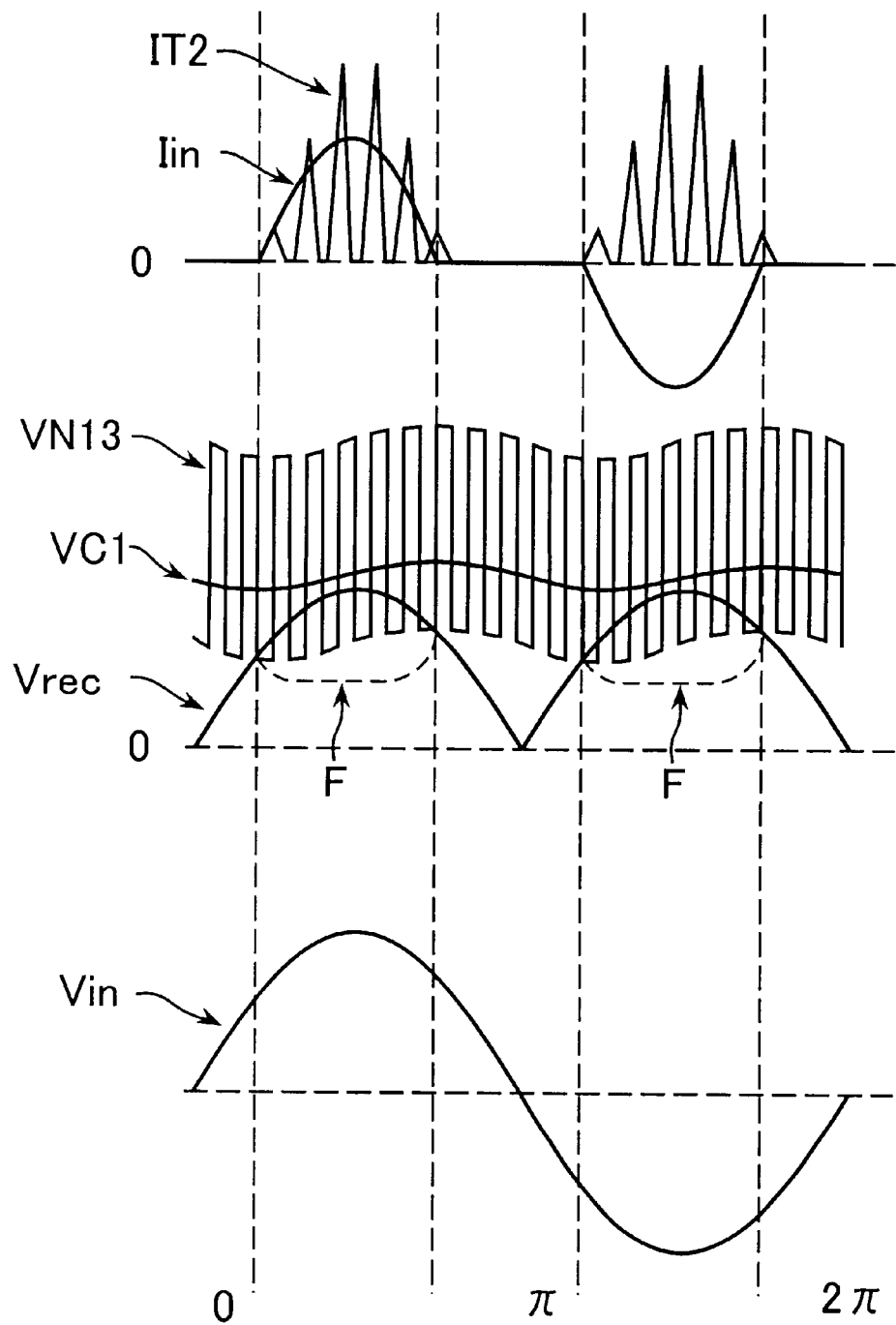
FIG. 5 is a waveform chart depicting waveforms occurring at different parts of the embodiment of FIG. 3.

In FIG. 4, the embodiment was described with reference to a waveform chart having a time axis whose one period, in which switch Q is turned ON and OFF, is short. For greater understanding of the embodiment, the waveform chart is also represented by using a one period time axis of AC power source AC. FIG. 5 shows the results of such representation.

More specifically, in FIG. 5, a one period time axis of AC power source AC is represented against magnetizing current IT2 flowing into coupled inductor device 40; input current Iin; voltage VN13 developed across winding N13; voltage VC1 developed across terminals of capacitor C1; rectified voltage Vrec of AC power source AC; and input voltage Vin. As is evident from FIG. 5, in the invention, the input current Iin is turned ON when individual Voltages satisfy the condition where VN13≦Vrec holds true (see the areas indicated by the dotted line F in FIG. 5). Accordingly, it is possible to widen the conduction angle of the input current Iin and improve the power factor, as compared with the conventional switching power supply.

Moreover, with the invention, advantageously, it is also possible to reduce the amount of current flowing through switch Q by defing or setting the number of turns of winding N21 and winding N22 to be n21>n22. The reason for so defining or setting the number of turns of the windings will be discussed with reference to FIGS. 6 and 7.

Figure 6:
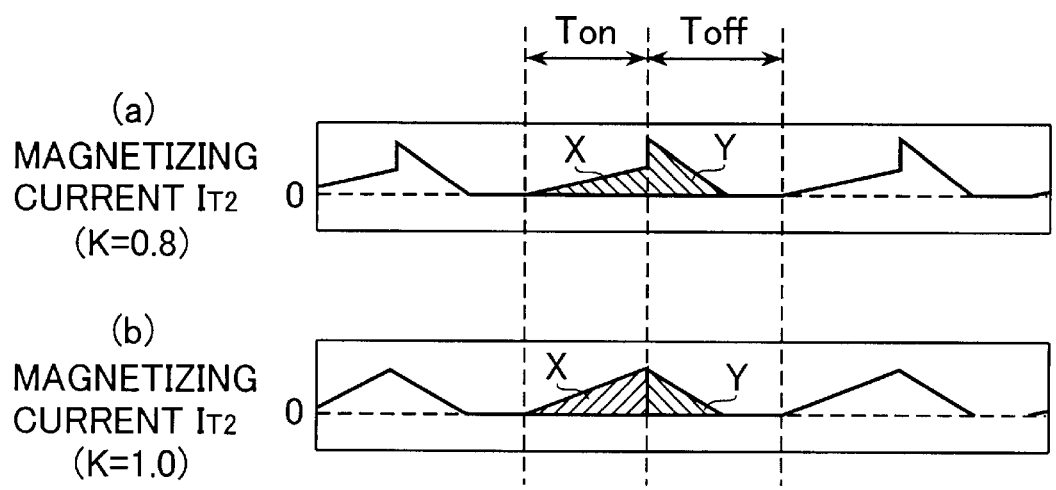
FIG. 6 is a waveform chart depicting excitation current in the embodiment of FIG. 3.
Figure 7:
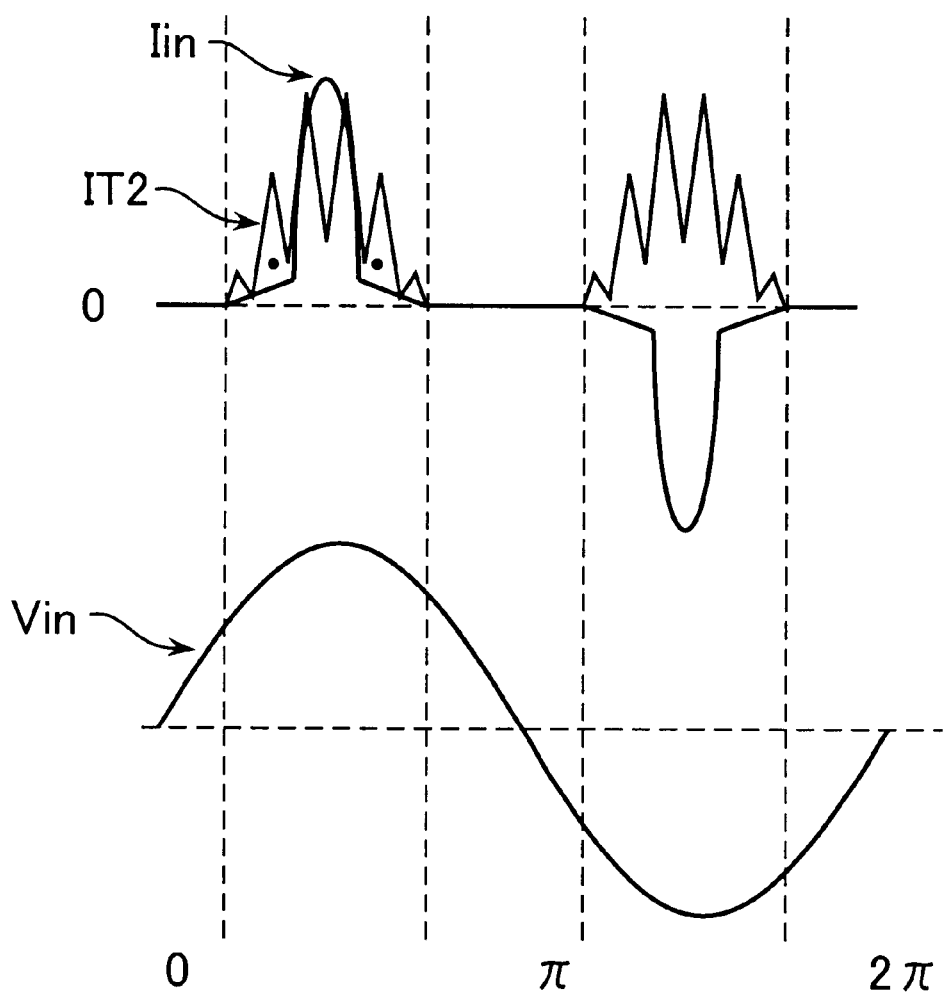
FIG. 7 is a waveform chart depicting waveforms occurring at different parts of the embodiment of FIG. 3.

In FIG. 6, line (a) is an enlarged view of the waveform of the magnetizing current IT2 indicated by P9 in FIG. 4; and line (b) is the waveform of the magnetizing current IT2 when the number of turns of winding. N21 and winding N22 are defined or set as n21=n22. As priorly discussed, magnetizing current IT2 has two current components; a shaded area X in the waveform of the magnetizing current IT2 represents a current component which is turned ON by current IN21 and a shaded area Y represents a current component turned ON by current IN22.

The amount of magnetizing current IT2 flowing into transformer T2 is represented by the shaded area of the waveform. In line (a), the current IN21 is kept lower so that current IN22 is increased by the same amount, by setting the number of turns of winding N21 and winding N22 to be n21>n22. Current ISW flowing through switch Q is proportional to current IN21, and current IN22 flowing into capacitor C1. Accordingly, it is possible, with the invention, to suppress current IN21, that affects current ISW flowing through switch Q, and to increase current IN22 flowing into capacitor C1 by setting the number of turns of winding N21 and winding N22 to be n21>n22. Hence, similar to the case where the number of turns of the winding N21 and winding N22 are equal to each other, namely, n21=n22, with the invention, it is possible to reduce the amount of current flowing into switch Q while maintaining the amount of total current at the same level.

Accordingly, as described, with the invention, it is possible to improve the power factor substantially, as compared with the conventional switching power supply. However, with the just described embodiment, the magnetizing current IT2 flowing into coupled inductor 40, in some case might not go to zero, such as shown in FIG. 5, when for example, the load circuit 31 demands a greater amount of power. In that case, the waveform of the input current Iin may become distorted, resulting in the problem that the conduction angle of the current may become narrow, and the power factor may deteriorate.

Advantageously, with the invention, however, it is possible to improve the power factor even in such a case as discussed above, by adjusting the coupling coefficient of transformer T2 to be as low as 0.9 or less. The adjustment method is discussed further hereinbelow.

Figure 8:
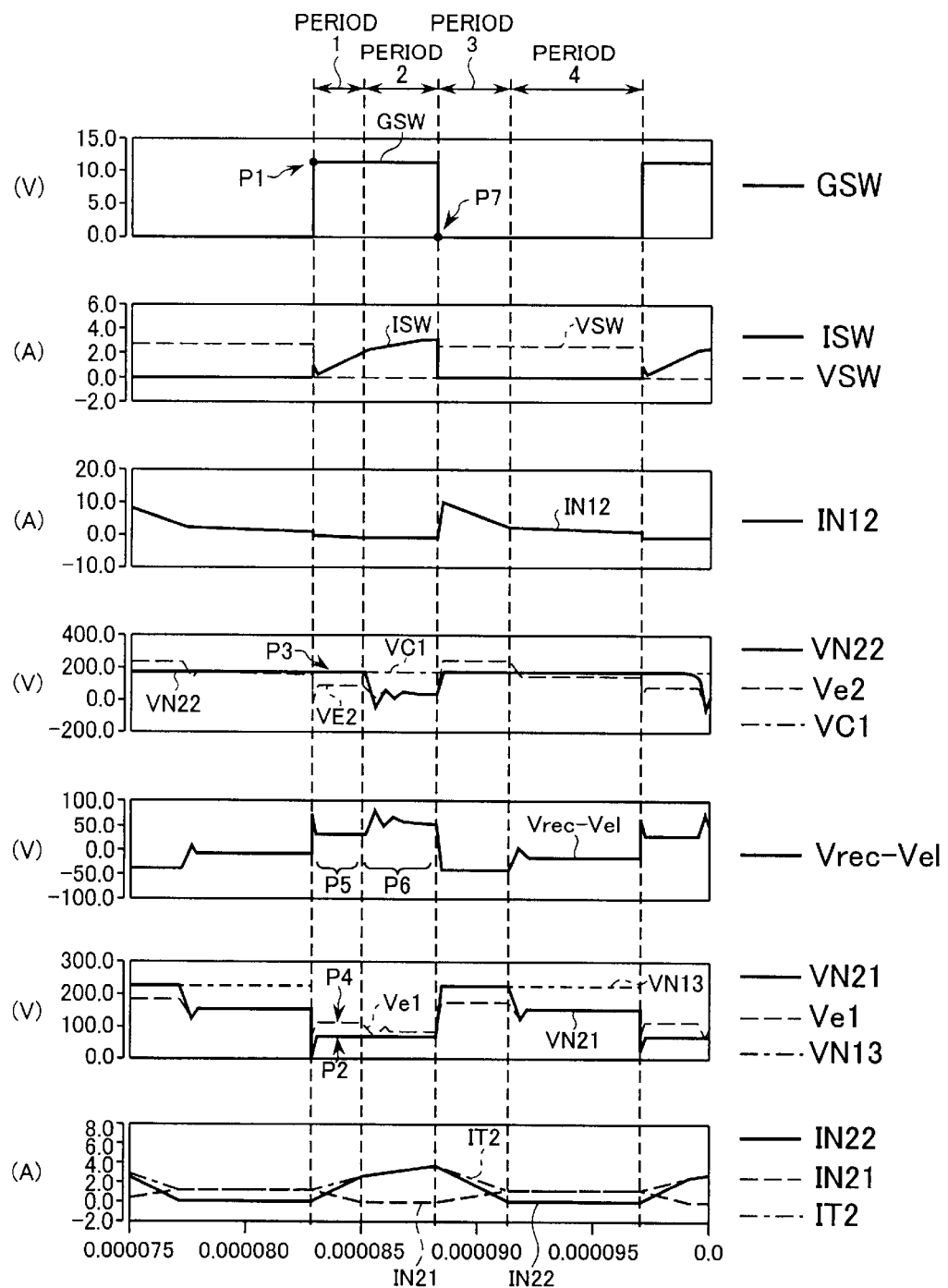
FIG. 8 is waveform chart depicting waveforms occurring at different parts of the embodiment of FIG. 3.

FIG. 8 shows waveforms of signals occurring in the main parts of the embodiment of FIG. 3, wherein inductance L of transformer T2 is set, as an example, to be 200 $\mu$H, the number of turns of winding N21 and winding N22 is set, as an example, to be n21:n22=1:2; the coupling coefficient K is set, for example, to be 0.8; the static capacitance of capacitor C1 is set, for example, to be 330 $\mu$F; the inductance L of transformer T1 is set, for example, to be 1.39 mH; the number of turns of winding N11 and winding N12 and winding N13 of transformer T1 is set, for example, to be n11:n12:n13=43:24:29; and the static capacitance of capacitor C2 is set, for example, to be 1000 $\mu$F.

Figure 9:
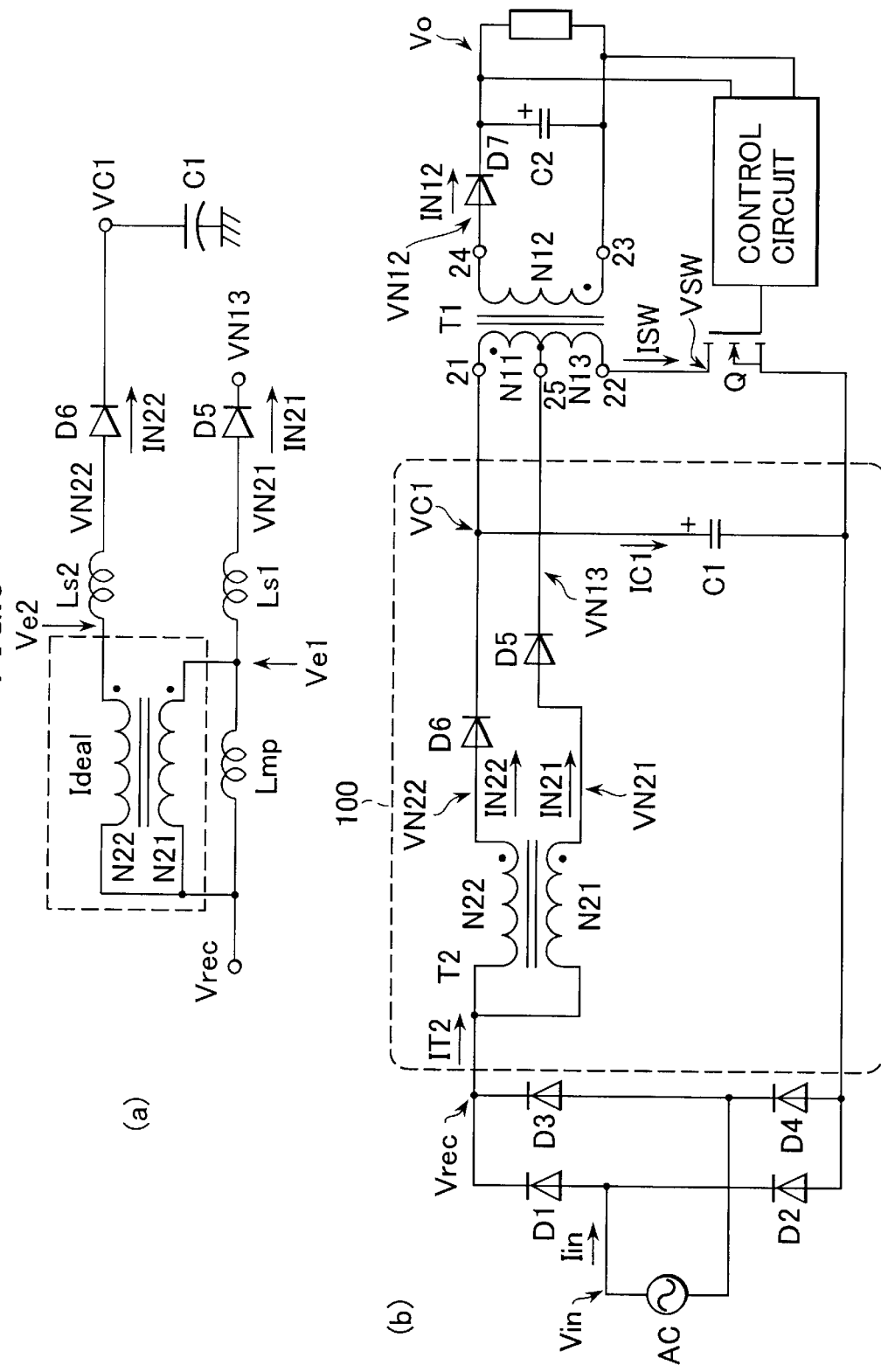
FIG. 9 is a diagram depicting an equivalent circuit of a switching power supply according to the invention.

FIG. 9 depicts an equivalent circuit, in part (a) thereof, of components indicated by the dotted lines 100 in part (b) thereof. In the switching power supply depicted in FIG. 9, part (b), when the coupling coefficient K is set to be 0.8, in FIG. 9, part (a) there is shown, a transformer "Ideal" denoting an ideal transformer having windings N21 and windings N22; an "Lmp" denoting a magnetizing inductance; and "Ls1" and "Ls2" denoting leakage inductances.

The operation of FIG. 9 is now described with reference to FIG. 8 with particular reference also being made to FIG. 9, part (a), which shows the equivalent circuit. To simplify the description, voltage drops in the parasitic resistance and in the diodes D5, D6 and D7 are ignored in the following description. Also, the case where magnetizing current T12, flowing into coupled inductor device 40, is reduced to zero, is referred to as a discontinuous inductor current mode (DCM), and the case magnetizing current IT2 is not reduced to zero is referred to as a continuous inductor current mode (CCM).

FIG. 8 shows waveforms of the following signals: control signal GSW of switch Q; voltage VSW developed across terminals of switch Q; current ISW flowing into switch Q; current IN12 flowing through winding N12; voltage VN22 developed across winding N22; voltage Ve2 produced in leakage inductance Ls2; voltage VC1 developed across capacitor C1; difference between rectified voltage Vrec and voltage Ve1 developed across leakage inductance Ls1; voltage VN21 develope across winding N21; voltage Ve1 produced in leakage inductance Ls1; voltage VN13 developed across winding, N13; currents IN21 and IN22 flowing through winding N21 and winding N22; and magnetizing current IT2 flowing into coupled inductor device 40.

When switch Q is turned ON (at a point in time indicated by P1 in FIG. 8) during period 1 of FIG. 8, voltage VC1 of capacitor C1 is applied across primary winding of transformer T1. At center tap 25 of transformer T1, voltage VN13 (indicated by P2 in FIG. 8) corresponding t the number of turns of primary windings N11 and N13 appears. Assuming that the number of turns of winding N11 and winding N13 are n11 and n13, respectively, the voltage VN13 produced at this point is $$VN13=[n13/(n11+n13)]\times VC1 \quad (4)$$

Since the reset current of leakage inductance Ls2 is turned ON at this point, diode D6 is turned ON and voltage VN22 applied to one end of capacitor C1 side of leakage inductance Ls2 equals voltage VC1 (at a point in time indicated by P3 in FIG. 8).

At the same time, the magnetizing currents of the magnetizing inductance Lmp and leakage inductance Ls1 are turned ON, thereby causing a voltage, applied to one end of diode bride side of leakage inductance Ls1, to be equal to voltage Vrec, and voltage VN21 applied to one end of the center tap 25 side of leakage inductance Ls1 to be equal to voltage VN13 (at a point in time indicated by P4 i FIG. 8). Accordingly, voltage Ve1 at the connection point between magnetizing inductance Lmp and leakage inductance Ls1 is as follows:

$$Ve1=[Vrec/Lmp+\{(n21/n22)\times VC1+(1-n21/n22)\times Vrec\}/\{(n21/n22)^2 \times Ls2\}+VN13/Ls1]/[1/1\ mp+1/\{(n21/n22)^2\times Ls2\}+1/Ls1] \quad (5)$$

At this point, magnetizing voltage Vrec−Ve1 of magnetizing inductance Lmp in period 1 (in the interval indicated by P5 in FIG. 8) falls below the magnetizing voltage Vrec−Ve1 in period 2 (in the interval indicated by P6 in FIG.8 ). This condition continues until period 1 is over (i.e. resetting the leakage inductance Ls2 is completed). Also, since the current flowing through diode D6 is decreased gradually as leakage inductance Ls2 is reset, diode D6 goes through the process of "soft switching turning off."

Accordingly, although magnetizing inductance Lmp is excited by voltage VN13 developed at center tap 25, the amplitude of the magnetizing voltage is decreased by the leakage inductance during period 1. Thus, the effective time interval of magnetizing becomes shorter than the ON state time interval of switch Q. Also, since period 1 becomes longer as the input current Iin is increased,the effective magnetizing time interval of the leakage inductance Lmp is shortened; thus, causing suppression of the input current Iin.

Since the magnetizing current of leakage inductance Ls1 flows through switch Q during that time interval, according to the number of turns n11and n13at center tap 25, the gradient of the magnetizing current is increased.

When the resetting of the leakage inductance Ls2 is completed in period 2 of FIG. 8, the diode D6 is turned OFF; a magnetizing current is caused to flow through the serially connected magnetizing inductance Lmp and leakage inductance Ls1; and voltage Ve1 at the connection point therebetween is as follows:

$$Ve1=(Vrec/Lmp+VN13/Ls1)/(1/1\ mp+1/Ls1) \quad (6)$$

Hence, the magnetizing voltage Vrec—Ve1 in period 2 becomes larger than in period 1, as shown by P6 in FIG. 8. Because of the magnetizing current of the serially connected magnetizing inductance Lmp and leakage inductance Ls1 flowing through switch Q during period 2, according to the number of turns of windings n11 and n13with center tap 25 therebetween, the gradient of the magnetizing current is decreased.

When switch Q is turned OFF in period 3 of FIG. 8, at a point in time indicated by P7 in FIG. 8, the voltage across the windings of transformer T1 is inverted, thus causing diode D7 on the secondary winding side to be turned ON and the reset current of transformer T1 to flow through the secondary winding. At the same time, the reset current of leakage inductance Ls1 is caused to flow through diode D5, transformer T1, primary windings N11,and smoothing capacitor C1, in that sequence.

Since primary winding N11 and secondary winding N12 of transformer T1 are transformer coupled, a current corresponding to the number of turns is caused to flow through the secondary winding side and is superposed on the reset current of transformer T1. Period 3 continues until the resetting of the leakage inductance Ls1 is completed and diode D5 is turned OFF. Thus, the current caused by the reset current of leakage inductance Ls1 to flow through diode D5 is gradually decreased, thereby causing diode D5 to go through the process of "soft switching turn off".

In period 4 of FIG. 8, only the reset current of transformer T1 is caused to flow through the secondary winding side. Also, magnetizing inductance Lmp is reset by way of the ideal transformer "Ideal".

Hence, the reset current is caused to flow through leakage inductance Ls2, diode D6, and smoothing capacitor C1, in that sequence. Assuming the number of turns of winding N21 and winding N22 of ideal transformer "Ideal" are n21 and n22, respectively, then, voltage Ve2 at the connection point between ideal transformer "Ideal" and leakage inductance Ls2 is as follows:

$$Ve2=[Vrec/\{(n22/n21)^2 \times Lmp\}+VC1/Ls2]/[1/\{(n22/n21)^2 \times Lmp\}+1/Ls2] \quad (7)$$

As a result, magnetizing current IT2 of FIG. 8 is caused to flow through coupled inductor device 40 and input current Iin is turned ON.

FIG. 10 shows actually measured waveforms of input current Iin when the invention was operated in a continuous inductor current mode, wherein symbol (a) indicates the waveform of the input current Iin when the coupling coefficient K of transformer T2 was set to 1; symbol (b) indicates the waveform when the coupling coefficient K was set to 0.8; and symbol (c) indicates a view wherein the waveform was filtered and the waveform of the input voltage Vin was overlaid thereon.

As is evident from FIG. 10, conduction angle LD0.8 of input current Iin, when coupling coefficient K of transformer T2 was set to 0.8 is greater than the conduction angle LD1 when the coefficient coupling K was set to 1. Accordingly, when the invention was operated in a continuous inductor current mode, improvement of the power factor was obtained through adjustment of the coupling coefficient of the transformer to a smaller value. Also, since the waveform of input current Iin becomes smoother as a result of the conduction angle thereof being made wider, it is possible to prevent harmonic currents from being generated.

Figure 11:
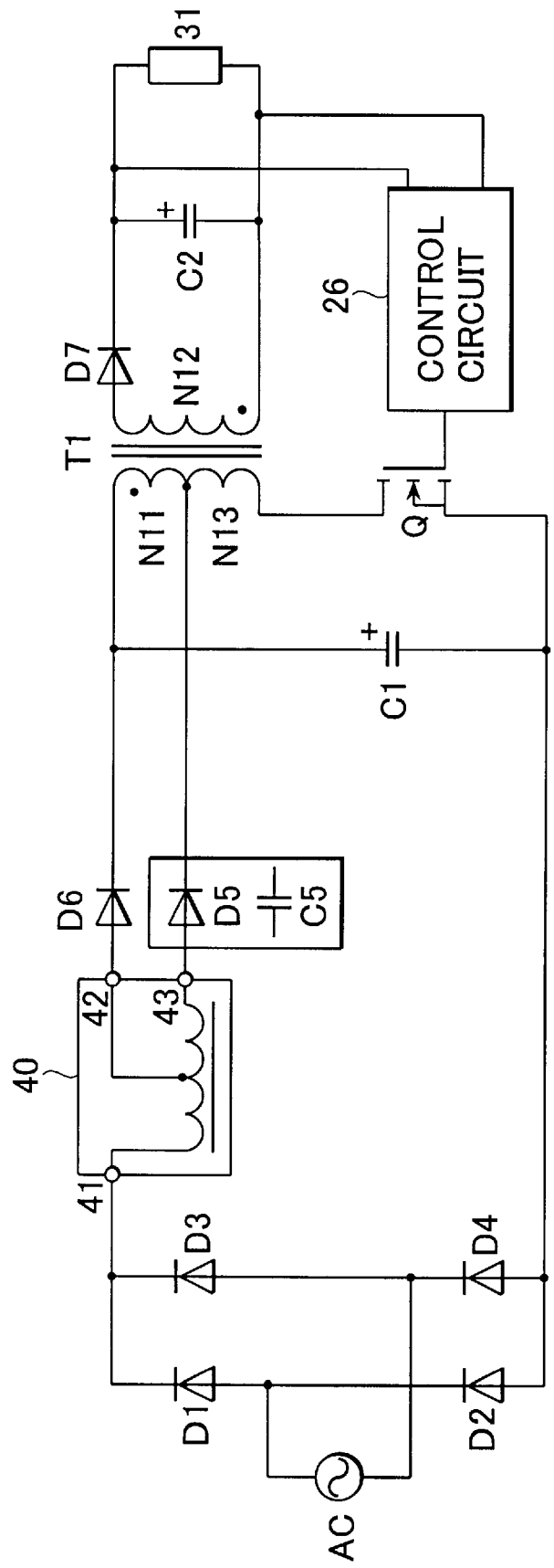
FIG. 11 is a block diagram depicting another illustrative embodiment of the invention.

Other modifications of the invention are discussed below. For example, in FIG. 11, an inductor 40, not having a center tap as shown in FIG. 3, is depicted. The coupled inductor device 40 shown in FIG. 3 can also be implemented by means of transformer T2 having winding N21 and winding N22. In consideration of the polarities of the two windings N21,N22, and the number of turns thereof being N21>N22, it can be concluded that the circuit of FIG. 11 is just as advantageous as that of FIG. 3. The FIG. 11 modification has an advantage over the embodiment of FIG. 3 in that the number of turns of the windings can be reduced, as compared to the coupled inductor device 40 of FIG. 3. Another advantage of the FIG. 11 modification is that a DC cutoff capacitor can be used as a DC voltage cutoff device, instead of diode D5.

Figure 12:
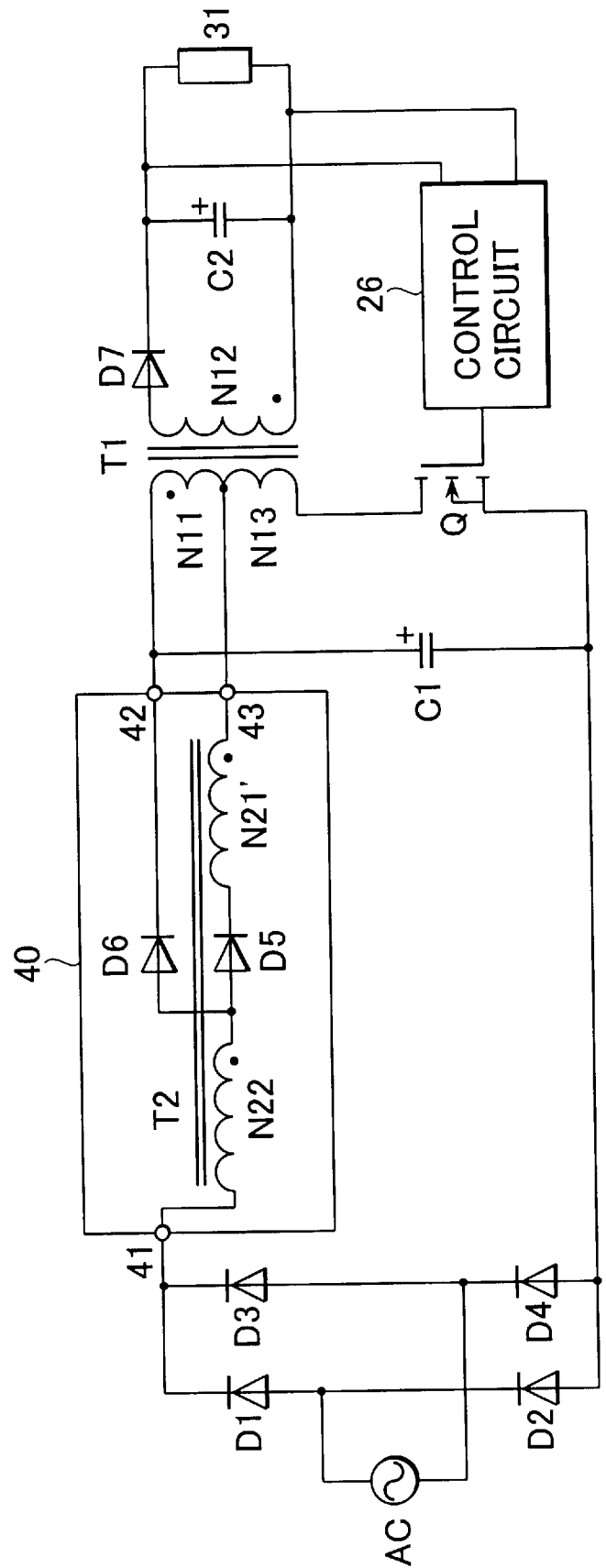
FIG. 12 is a block diagram depicting still another illustrative embodiment of the invention.

FIG. 12 shows another example of a modification wherein the embodiment of FIG. 11 is modified so that the resulting embodiment can implement the same operation as the embodiment of FIG. 3. FIG. 12 shows diodes D5, D6 connected within the inductor device 40 instead of being outside the inductor device 40 as in FIG. 11.

The coupled inductor device 40 may be implemented in other ways, such as for example, by using a center tapped inductor, as shown in FIG. 13(*a*) or a delta connected inductor, as shown in FIG. 13(*b*), or a Y-connected inductor, as shown in FIG. 13(*c*).

Figure 14:
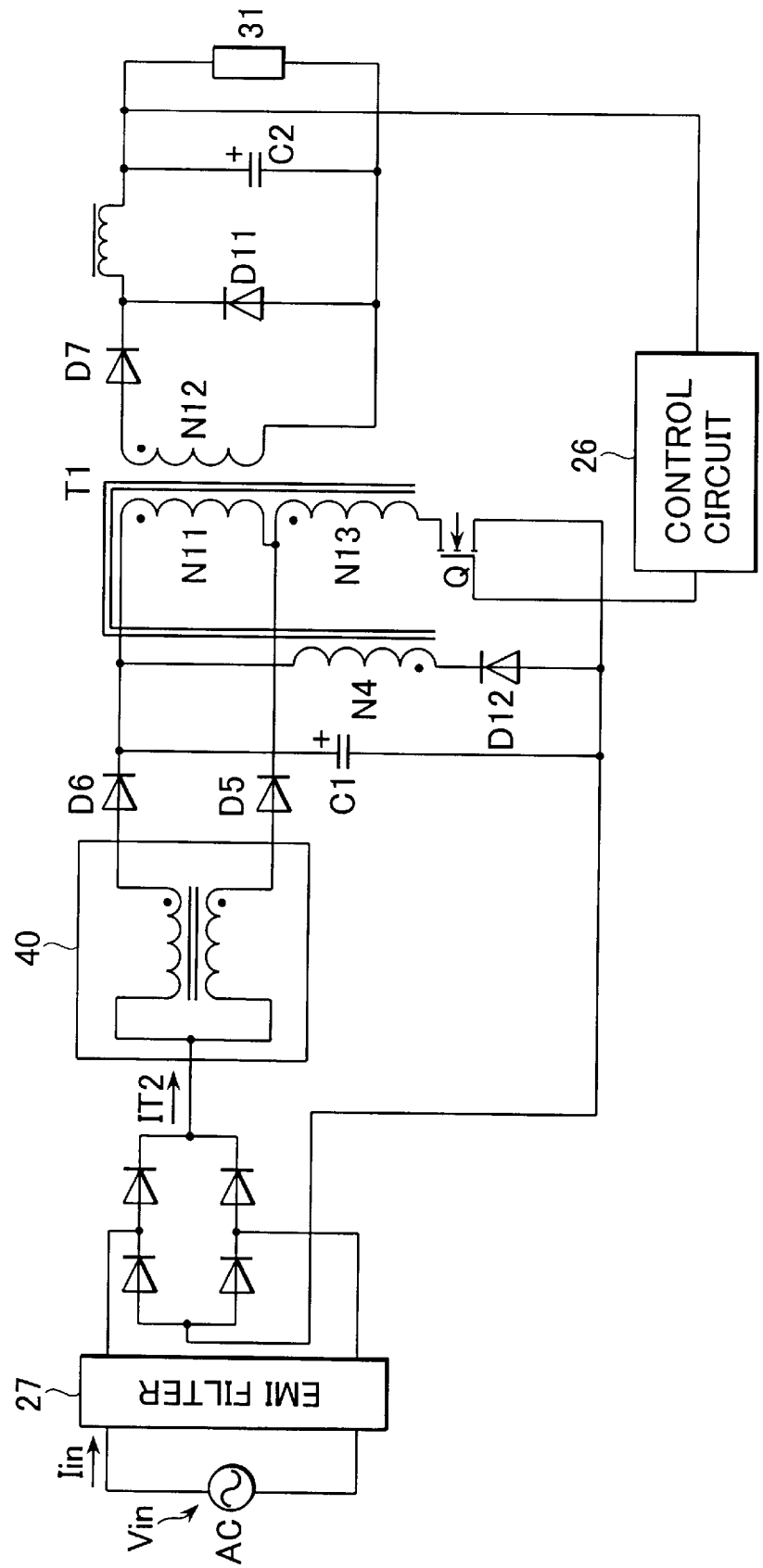
FIG. 14 is a block diagram depicting a further illustrative embodiment of the invention.
Figure 15:
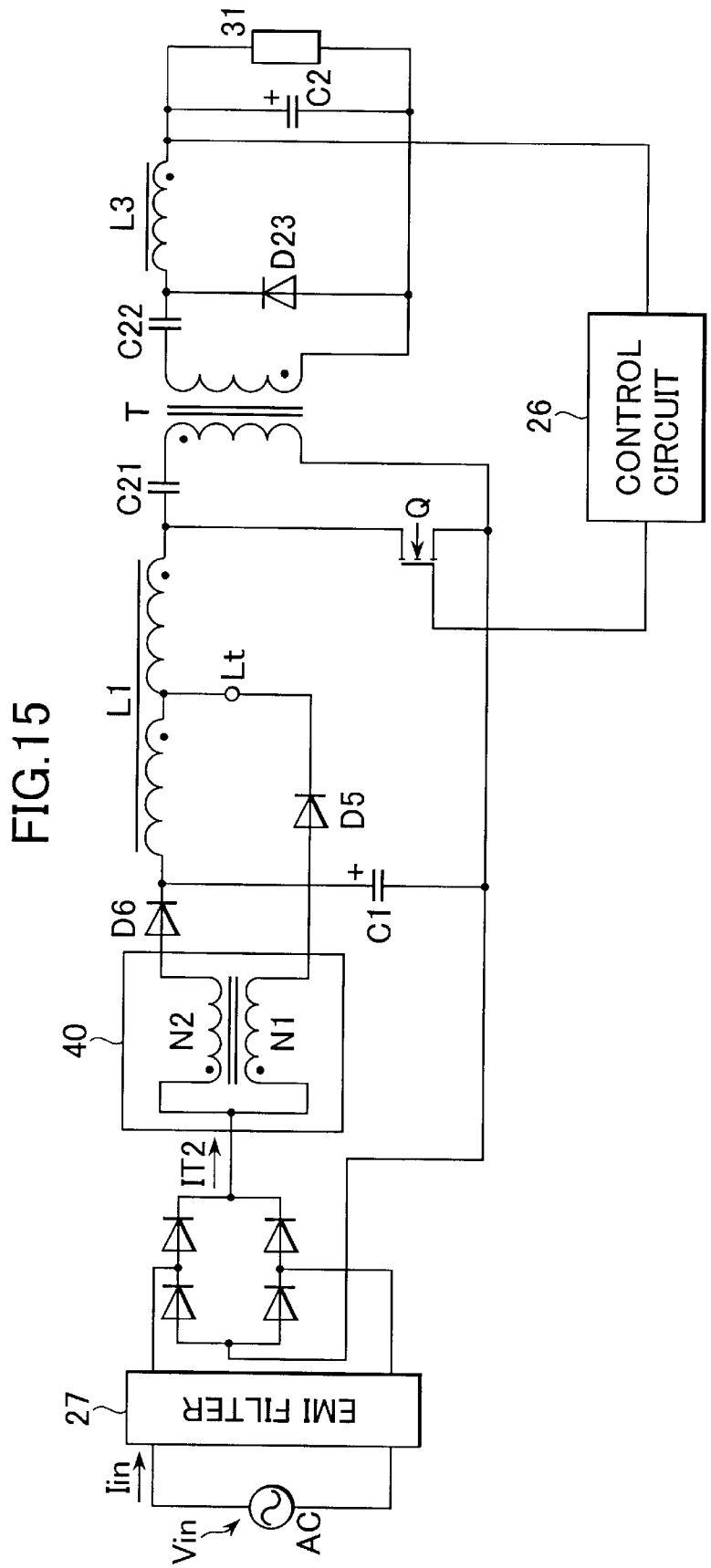
FIG. 15 is a block diagram depicting yet further illustrative embodiment of the invention.

Furthermore, the invention may be applied to a forward converter, as shown in FIG. 14, or to a Cuk converter, as shown in FIG. 15. In the Cuk converter embodiment of FIG. 15, it is possible to use a voltage developed at the center tap Lt as a high frequency AC voltage source for driving coupled inductor device 40, by connecting the center tap Lt of inductor Li comprising the Cuk converter, to the cathode of diode D5. Also, it is possible to prevent contamination by external electromagnetic noise, by providing an EMI filter 27 to filter the AC input signal, as shown in FIGS. 14 and 15.

Figure 16:
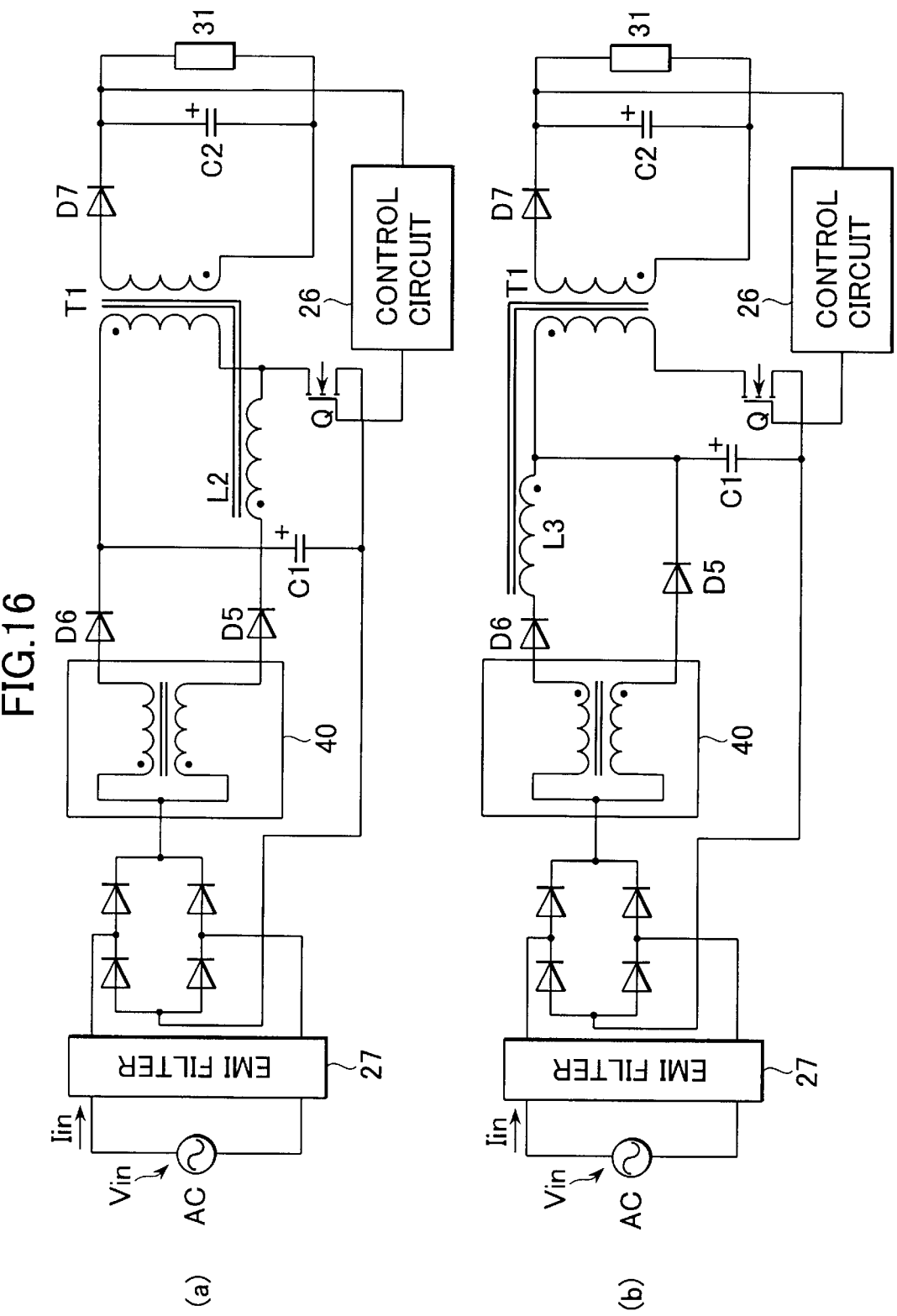
FIG. 16 is a block diagram depicting still further illustrative embodiment of the invention.

Another advantage of the invention is that an additional winding L2 or L3 may be disposed on the primary winding side of transformer T1 and connected to the cathode of diode D5 or D6, as shown in FIGS. 16(*a*) and 16(*b*), so that a voltage developed across the additional winding L2 or L3 may be used as a high frequency AC voltage source for driving the coupled inductor device 40.

In the foregoing description, specific preferred embodiments are set forth. Numerous extensions and modifications thereof would be apparent to the worker skilled in the art. All such extensions and modifications are to be considered to be within the spirit and scope of the invention.

For example, the invention may be applied to a DC/DC converter of the half-bridge type, the SEPIC type, or the Zeta type, in addition to the embodiments priorly set forth.

As is evident from the foregoing, the instant invention offers the following, among various other advantages:

In the switching power supply of the invention, it is possible to improve the power factor thereof in a discontinuous inductor current mode, by using the coupled inductor device variously described above. The power factor can also be improved by a continuous inductor current mode, by adjusting the coupling coefficient of the coupled inductor device described above, to a smaller value.

Accordingly, and advantageously, the invention improves the power factor, in either a discontinuous inductor current mode or a continuous inductor current mode, by using the coupled inductor device various discussed above and by adjusting the coupling coefficient thereof in a circuit comprising the same number of elements. This advantage is effective in reducing the cost of switching power supplies, and also in increasing the reliability and efficiency thereof.

A coupled inductor device having a coupling coefficient K of 0.8 more or less may be easily implemented by placing a barrier as wide as a few millimeters in the middle of a bobbin, such as an EE core, and then providing the bobbin with two separate windings on both sides of the barrier. Accordingly, it is possible, with the invention, to keep the cost of producing the coupled inductor device substantially the same as that of an inductor used with a conventional power supply or even at a lower cost.

Another advantage of the invention is that the magnetizing current of the coupled inductor device can be kept small when the device is operated in a continuous inductor current mode, by setting the inductance of the device to be higher than that when the device is operated in a discontinuous inductor current mode. Accordingly, it is possible to suppress an rms current that flows through switch Q, primary windings of the transformer T1, diode D5 and diode D6. Also, by use of the leakage inductance, diodes D5 and D6 go through the process of "soft switching turn off", whereby the recovery loss of the diodes is prevented from occuring. Accordingly, it is possible to further increase the efficiency of the switching power supply.

A further advantage of the invention is that the amplitude of the switched component of the input current is suppressed, thereby to reduce the normal mode noise. This enables the invention to reduce the size and cost of any EMT filter used with any equipment to which the switching power supply may be adopted.

A still further advantage of the invention is a decrease in the reset current of the coupled inductor device. Accordingly, with the invention, it is possible to prevent increase in smoothing capacitor voltage due to the reset current. This result has been actually verified, as evidenced by the test results shown in FIG. 17.

Accordingly, the switching power supply of the invention, when operated in a continuous inductor current mode has the effect of reducing cost of switching power supplies since low voltage componets can be used in this mode, as compared with components used in a conventional device operated in a discontinuous inductor current mode.

What is claimed is:

1. A switching power supply apparatus comprising:
   a first rectifying circuit for rectifying an AC input signal of an ordinary frequency from an AC power source into a DC signal, said first rectifying circuit comprising a positive output terminal;
   a smoothing circuit for smoothing the rectified DC signal from said first rectifying circuit, said smoothing circuit having a positive terminal and a negative terminal;
   a DC/DC converter for converting the smoothed and rectified DC signal from said smoothing circuit into an output DC signal, said DC/DC converter comprising:
   a switching device operable at a high frequency;
   a first transformer comprising a primary winding having a first terminal connected to said positive terminal of said smoothing circuit, a center terminal, and a second terminal connected to said switching device and therethrough to said negative terminal of said smoothing circuit, and a secondary winding for providing an output signal;
   second rectifying circuit connected to a terminal of said secondary winding of said first transformer for rectifying said output signal from said secondary winding of said first transformer into said output DC-signal, and
   control circuit connected to said secondary winding of said first transformer and to said switching device for monitoring and controlling frequency of said switching device and said output DC signal from said second rectifying circuit; and
   an inductor device disposed between said first rectifying circuit and said DC/DC converter and comprising:
   a first inductor,
   a second inductor connected to said first inductor,
   a first terminal,
   a second terminal,
   a third terminal, wherein
   said first, second and third terminals are connected to said first and second inductors, and wherein said first terminal is also connected to said positive output terminal of said first rectifying circuit, said second terminal is also connected to said positive end of said smoothing circuit and to said first terminal of said primary winding of said first transformer so as to supply the smoothed and rectified input signal of ordinary frequency as inductor influenced to said primary winding,and said third terminal is also connected to said center terminal of said primary winding of said first transformer, wherein said switching device under control of said control circuit selectively controls frequency of the rectified and smoothed input signal provided to a part of said primary winding of said first transformer located between said center terminal and said second terminal so that said rectified and smoothed input signal is made to be of a high frequency, whereby inductor influenced input signal of an ordinary frequency and inductor influenced input signal of a higher frequency are concurrently supplied to said primary winding of said first transformer to cause output signal to be generated in said secondary winding of said first transformer which is substantially free of harmonic current, and whereby power factor of said apparatus is increased.

2. The apparatus of claim 1, wherein said third terminal is connected to said center terminal of said primary winding of said first transformer through a voltage cutoff device.

3. The apparatus of claim 2, wherein said cutoff device is a cutoff capacitor or diode.

4. The apparatus of claim 1, wherein said first inductor and said second inductor are a pair of windings in a second transformer, wherein input terminals of said pair of windings act as said first terminal, an output terminal of one of said pair of windings acts as said second terminal, and an output terminal of the other of said pair of windings acts as said third terminal.

5. The apparatus of claim 1, wherein said first inductor and said second inductor are connected serially to each other with a center tap at the connection point therebetween, wherein one end of the serially connected inductors acts as said first terminal, another end of the serially connected inducts acts as said second terminal, and said center tap acts as said third terminal.

6. The apparatus of claim 1, wherein said first inductor and said second inductor are connected serially to each other with a center tap at the connection point therebetween, wherein one end of the serially connected inductors acts as said first terminal, said center tap acts as said second terminal acts as said second terminal, and another end of said serially connected inductors acts as said third terminal.

7. The apparatus of claim 1, wherein said inductor device further comprises a third inductor connected to said first and second inductors as three delta connected windings, wherein connection points between each of two delta connected windings act as said first, second and third terminals.

8. The apparatus of claim 1, wherein said inductor device further comprises a third inductor connected to said first and second inductors as three Y-connected windings, wherein terminals on different sides of a common connection point of said three Y-connected windings act as said first, second and third terminals.

9. The apparatus of claim 1, wherein said inductor device has a coupling coefficient of 0.9 or smaller.

10. The apparatus of claim 1, wherein said first and second inductors comprise at least a pair of windings having different number of turns.

11. The apparatus of claim 1, wherein high frequency signals are developed at said center terminal of said primary winding of said first transformer.

12. The apparatus of claim 1, wherein said DC/DC converter further comprises a second winding which produces high frequency signals.

13. The apparatus of claim 1, wherein said DC/DC converter is of a type selected from the types consisting of a fly-back type, a forward type, a half-bridge type, a Cuk type, a SEPIC type and a Zeta type.

14. The apparatus of claim 1, wherein said inductor device is a coupled inductor.

15. The apparatus of claim 1, wherein said smoothing circuit comprises a capacitor circuit.

16. The apparatus of claim 1, wherein said second terminal of said inductor device is connected in series to said smoothing circuit through a diode.

* * * * *